(12) United States Patent
Kosslyn

(10) Patent No.: US 10,862,954 B2
(45) Date of Patent: Dec. 8, 2020

(54) SOLICITING AND CREATING COLLABORATIVE CONTENT ITEMS

(71) Applicant: Google LLC, Mountain View, CA (US)

(72) Inventor: David Kosslyn, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 198 days.

(21) Appl. No.: 15/837,491

(22) Filed: Dec. 11, 2017

(65) Prior Publication Data

US 2018/0103087 A1 Apr. 12, 2018

Related U.S. Application Data

(63) Continuation of application No. 14/279,533, filed on May 16, 2014, now Pat. No. 9,854,025.

(51) Int. Cl.
*H04L 29/08* (2006.01)
*G06Q 10/10* (2012.01)
*G06Q 50/00* (2012.01)

(52) U.S. Cl.
CPC ............ *H04L 67/10* (2013.01); *G06Q 10/10* (2013.01); *G06Q 10/101* (2013.01); *G06Q 10/109* (2013.01); *G06Q 50/01* (2013.01)

(58) Field of Classification Search
CPC ...... G06Q 30/02; G06Q 10/109; H04L 51/32; H04L 65/403; H04L 63/10; G06F 21/6218; G06F 3/0484
See application file for complete search history.

(56) References Cited

U.S. PATENT DOCUMENTS

| 8,001,088 B2* | 8/2011 | Tawa | G06F 16/22 707/673 |
| 8,185,643 B2* | 5/2012 | McMullen | G06F 21/6218 709/229 |

(Continued)

FOREIGN PATENT DOCUMENTS

| CN | 102655633 A | 9/2012 |
| CN | 102779312 A | 11/2012 |

(Continued)

OTHER PUBLICATIONS

International Search Report for International Application No. PCT/US2015/026683, dated Jul. 22, 2015, 3 pages.

(Continued)

*Primary Examiner* — Shean Tokuta
(74) *Attorney, Agent, or Firm* — Lowenstein Sandler LLP

(57) ABSTRACT

A method for soliciting and creating collaborative content items is disclosed. The method includes receiving, by a user device of a first user, a request to contribute a content item for a personalized message to a second user, the personalized message for an event unique to the second user, wherein the first user is selected to receive the request to contribute the content item based on an affinity score between the first user and the second user, presenting the request to contribute the content item, receiving input from the first user identifying the content item to contribute for the personalized message to the second user, and causing the content item to be added to a collaborative content product generated for the second user, the collaborative content product comprising other content items of other users of the social network.

22 Claims, 9 Drawing Sheets

(56) References Cited

U.S. PATENT DOCUMENTS

| | | | |
|---|---|---|---|
| 8,438,233 B2 | 5/2013 | Mallet et al. | |
| 8,935,422 B1* | 1/2015 | Terleski | G06F 16/9577 |
| | | | 709/231 |
| 8,984,082 B2* | 3/2015 | Weinstein | G06F 16/284 |
| | | | 709/206 |
| 2005/0144499 A1* | 6/2005 | Narahara | H04N 21/252 |
| | | | 714/1 |
| 2007/0110231 A1* | 5/2007 | Bales | H04L 63/10 |
| | | | 380/30 |
| 2009/0048892 A1* | 2/2009 | Harms | G06Q 30/00 |
| | | | 705/7.12 |
| 2009/0271256 A1* | 10/2009 | Toebes | G06Q 30/02 |
| | | | 705/14.53 |
| 2010/0153411 A1* | 6/2010 | Toebes | G06F 16/9535 |
| | | | 707/758 |
| 2011/0169927 A1* | 7/2011 | Mages | G06F 3/04815 |
| | | | 348/51 |
| 2011/0191692 A1* | 8/2011 | Walsh | G06F 3/00 |
| | | | 715/752 |
| 2011/0225239 A1* | 9/2011 | Kansal | G06Q 10/10 |
| | | | 709/204 |
| 2011/0236870 A1* | 9/2011 | Chinosornvatana | G09B 7/08 |
| | | | 434/322 |
| 2012/0030288 A1* | 2/2012 | Burckart | G06F 16/954 |
| | | | 709/205 |
| 2012/0054278 A1* | 3/2012 | Taleb | G06Q 50/01 |
| | | | 709/204 |
| 2012/0101966 A1* | 4/2012 | van Coppenolle | H04L 63/10 |
| | | | 706/20 |
| 2012/0221639 A1 | 8/2012 | Mallet et al. | |
| 2012/0257112 A1 | 10/2012 | Fritsch | |
| 2012/0278831 A1* | 11/2012 | van Coppenolle | |
| | | | H04L 65/4084 |
| | | | 725/25 |
| 2013/0046770 A1 | 2/2013 | Tseng | |
| 2013/0080565 A1* | 3/2013 | van Coppenolle | G06Q 30/02 |
| | | | 709/213 |
| 2013/0124662 A1* | 5/2013 | Yamamoto | G06F 13/00 |
| | | | 709/206 |
| 2013/0145284 A1* | 6/2013 | Anantharaman | H04L 63/10 |
| | | | 715/753 |
| 2013/0159115 A1 | 6/2013 | Adams | |
| 2013/0211970 A1 | 8/2013 | Glass et al. | |
| 2013/0215116 A1* | 8/2013 | Siddique | G06Q 20/204 |
| | | | 345/420 |
| 2013/0262588 A1 | 10/2013 | Barak et al. | |
| 2013/0268377 A1* | 10/2013 | Jessup | G06Q 50/01 |
| | | | 705/14.73 |
| 2013/0318013 A1* | 11/2013 | Tateno | H04N 21/26258 |
| | | | 706/12 |
| 2013/0325978 A1 | 12/2013 | Mansfield et al. | |
| 2014/0067953 A1* | 3/2014 | Weinstein | G06Q 50/01 |
| | | | 709/204 |
| 2014/0089099 A1 | 3/2014 | Money | |
| 2014/0195485 A1* | 7/2014 | Dorman | G06F 16/178 |
| | | | 707/624 |
| 2014/0237056 A1* | 8/2014 | Smalley | H04L 51/32 |
| | | | 709/206 |
| 2014/0258027 A1* | 9/2014 | Veugen | H04L 63/0428 |
| | | | 705/26.7 |
| 2015/0020126 A1* | 1/2015 | Kegel | H04N 21/6582 |
| | | | 725/87 |
| 2015/0046259 A1* | 2/2015 | Hicken | G06Q 30/0256 |
| | | | 705/14.54 |
| 2015/0207831 A1* | 7/2015 | Gaspari | H04L 67/36 |
| | | | 709/205 |
| 2015/0248411 A1* | 9/2015 | Krinker | G06F 16/24578 |
| | | | 707/748 |
| 2015/0326538 A1* | 11/2015 | Keane | G06F 21/10 |
| | | | 713/168 |
| 2015/0332062 A1* | 11/2015 | McReynolds | H04L 51/32 |
| | | | 726/28 |
| 2016/0034827 A1* | 2/2016 | Morris | G06F 3/04842 |
| | | | 705/5 |

FOREIGN PATENT DOCUMENTS

| | | |
|---|---|---|
| CN | 103119620 A | 5/2013 |
| KR | 1020070010221 | 1/2007 |
| KR | 1020070077523 A | 7/2007 |
| KR | 1020120105660 A | 9/2012 |
| KR | 1020140014753 | 2/2014 |

OTHER PUBLICATIONS

PCT Written Opinion of the International Searching Authority for International Application No. PCT/US2015/026683, dated Jul. 22, 2015, 7 pages.

USPTO, Office Action for U.S. Appl. No. 14/279,533, dated Jul. 13, 2016.

USPTO, Final Office Action for U.S. Appl. No. 14/279,533, dated Dec. 19, 2016.

USPTO, Office Action for U.S. Appl. No. 14/279,533, dated Mar. 22, 2017.

USPTO, Notice of Allowance for U.S. Appl. No. 14/279,533, dated Aug. 2, 2017.

USPTO, Notice of Allowance for U.S. Appl. No. 14/279,533, dated Nov. 14, 2017.

The extended European Search Report for EP Application No. EP 15792364.0, dated Dec. 14, 2017, 8 pages.

China National Intellectual Property Administration, Search Report for CN Application No. 201580026370.5, dated Dec. 20, 2018, 2 pages.

Australian Examination report No. 1 for standard patent application No. 2017272270, dated Feb. 21, 2019, 8 pages.

\* cited by examiner

400

Provide, via a GUI, a notification of a collaborative content product generated for a target user for an event unique to the target user
410

Facilitate, via the GUI, input from the target user requesting access to the collaborative content product
420

Provide, via the GUI, the collaborative content item for display to the target user
430

SOLICITING AND CREATING COLLABORATIVE CONTENT ITEMS

CROSS-REFERENCE TO RELATED APPLICATIONS

This application is a continuation of U.S. patent application Ser. No. 14/279,533, filed May 16, 2014, titled "Soliciting and Creating Collaborative Content Items," the entire content of which is incorporated by reference herein.

TECHNICAL FIELD

This disclosure relates to the field of content sharing platforms and, in particular, to soliciting and creating collaborative content items.

BACKGROUND

On the Internet, social networks allow users to connect to and share information with each other. Many social networks include a content sharing aspect that allows users to upload, view, and share content, such as video content, image content, audio content, text content, and so on (which may be collectively referred to as "media items" or "content items"). Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, and/or listen to digital music).

Many social networks today alert a user's contacts when any important event, such as a birthday, is approaching for the user. In some cases, these alerts prompt the contact to message the user regarding the important event (e.g., wishing them a happy birthday). However, often times the prompted messages from a user's contacts end up quite repetitive across the contacts, making them hollow and unmemorable. This is true for a variety of important events including not only birthdays, but also many other types of life events: congratulatory messages (new city, new job, promotion, engagement, getting married, new child), reflections (anniversary of meeting a friend, end of school year, end of job), and calamities (get well soon, condolences), among others.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for soliciting and creating collaborative content items is disclosed. The method includes identifying contacts of a target user, the contacts each having an affinity score with the target user that exceeds an affinity score threshold value. The method further includes soliciting, from each of the identified contacts, a content item curated by the identified contact to convey a personalized message to the target user corresponding to an event unique to the target user. The method also includes receiving the content items from at least a subset of the identified contacts, and providing a collaborative content product comprising the received content items to the target user.

In one implementation, the affinity score between each of the identified contacts and the target user is based on at least one of messaging frequency, co-occurrence in photographs, co-occurrence in videos, shared check-ins, shared contacts, shared subscriptions, and shared viewing statistics. In another implementation, the method further includes generating a container to maintain the received content items prior to the combining. In addition, the collaborative content product may include a playlist. Furthermore, the collaborative content product may include a single video.

In another implementation, the method further includes stitching the received content items together to generate the single video. The received content items may be ordered in the single video according to the affinity scores of the identified contacts providing the content items. The content items may be ordered in decreasing value of the affinity score of the corresponding contributing contact of the content item with the target user. Furthermore, the method may further include providing a one-time email address for the identified contacts to send their curated content item for the target user. In one implementation, the method may further include setting a privacy setting of the collaborative message to a default of the target user and the contributing contacts.

In a further implementation, the method includes receiving, from a designated contact of the contacts, a selection of a set of the contacts to solicit the contents items conveying the personalized messages for the target user. In addition, the method may include receiving an assignment of the designated contact as an owner of the collaborative content product, wherein the owner is provided permission to add new contacts to the collaborative content product and to update an order of the content items comprising the collaborative content product.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for soliciting and creating collaborative content items. In one implementation, a social network may include a collaborative content component that enables the solicitation of personalized messages for a target user of the social network from contacts of the user on the social network. The collaborative content component may also generate a collaborative content product for the target user based on the solicited personalized messages from the user's contacts. For example, the collaborative content component may solicit content for and assemble a video to make a more emotionally-compelling greeting or message around certain events corresponding to the target user.

The events of a user that implementations of the disclosure may solicit and create collaborative messages for include birthdays and/or other types of life events, such as congratulatory messages (new city, new job, promotion, engagement, getting married, new child), reflections (anniversary of meeting a friend, end of school year, end of job), and calamities (get well soon, condolences), among others. For example, the collaborative content component may encourage, in advance of a user's birthday, contacts of the user on the social network to contribute messages (in the form of video or otherwise) for the user's birthday. The collaborative content component may then aggregate the contributions of the contacts into a playlist or single video, for example, which is then released to the user on the day of his or her birthday.

Previous implementations of content sharing platforms and/or social networks do not provide a solution for soliciting and creating collaborative content items pertaining to a special event of a user. These content sharing platforms and social networks may encourage users to wish their friends happy birthdays, but the resulting messages are typically homogeneous and unoriginal (e.g., many "Happy Birthday, Jane" messages of Jane's birthday). The previous implementations did not coordinate a group of users to create a collaborative content item, such as a single video or a playlist, for a special event of a user. Implementations of the disclosure improve the user experience on a content sharing platform and/or social network by providing a compelling medium to crowd source personalized messages for a user to create a unique, experience. Implementations of the disclosure will create a more compelling feeling of being loved and valued by your friends.

Figure 1:
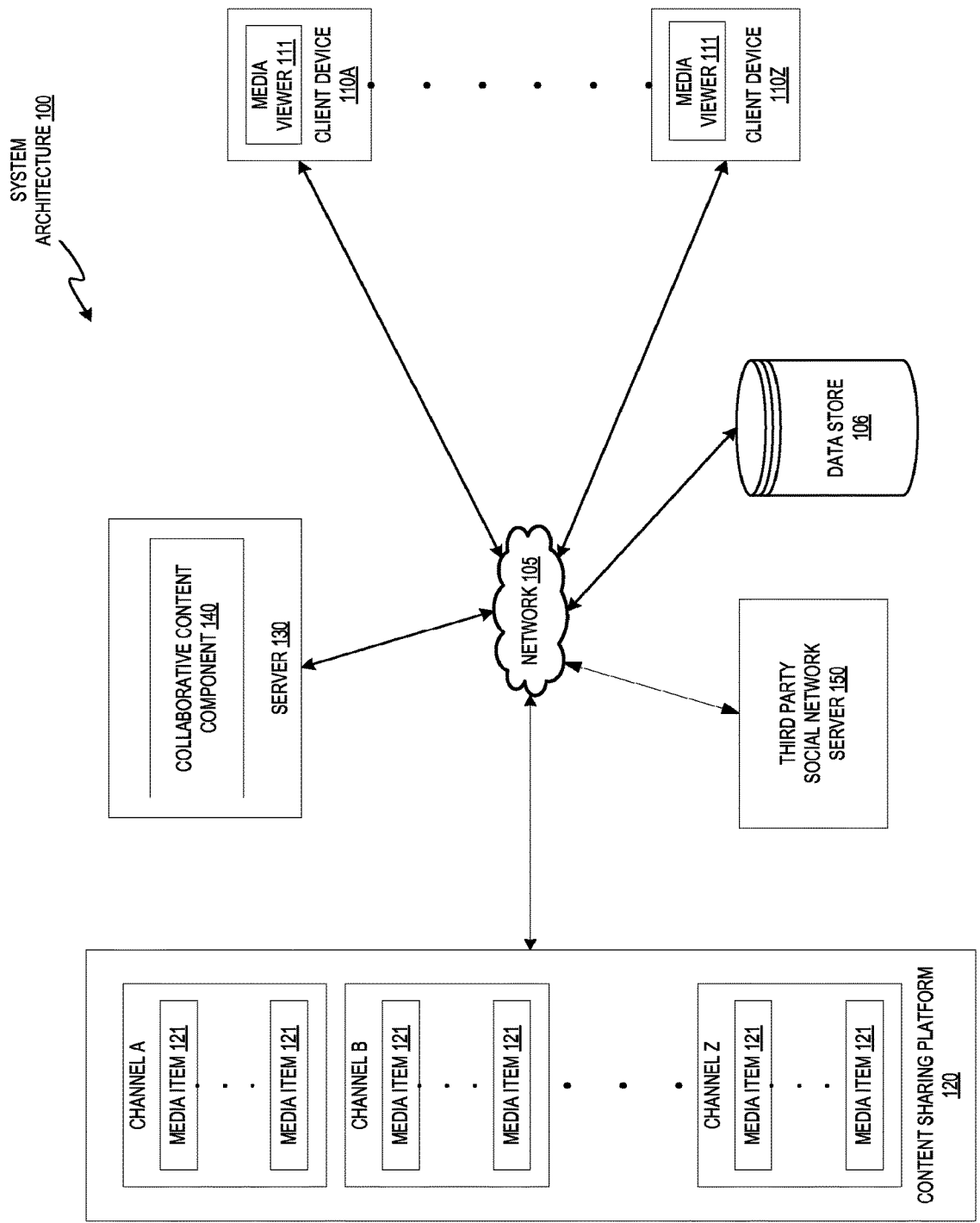
FIG. 1 illustrates an example system architecture, in accordance with one implementation of the disclosure.

FIG. 1 illustrates an example system architecture 100, in accordance with one implementation of the disclosure, for merging content channels of a content sharing platform. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware and/or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a collaborative content component 140. The collaborative content component 140 enables the solicitation of personalized messages for a user from contacts of the user (e.g., using third party social network server 150), as well as generation of collaborative content for the user based on the solicited personalized messages. For example, the collaborative content component 140 may solicit content for and assemble a video to make a more emotionally-compelling greeting or message around certain events corresponding to a user of a social network, such as content sharing platform 120.

In some implementations, the collaborative content component 140 may interact with multiple social networks and content sharing platforms. For example, the collaborative content component 140 may be a part of content sharing platform 120 and provide services for users of a third party social network, such as third party social network server 150, or vice versa. In other implementations, collaborative content component 140 may be part of an external system and provide services to content sharing platform 120 and third party social network server 150 individually, or in combination.

The events of a user that implementations of the disclosure may solicit and create collaborative messages for may include birthdays and/or many other types of life events, such as congratulatory messages (new city, new job, promotion, engagement, getting married, new child), reflections (anniversary of meeting a friend, end of school year, end of job), and calamities (get well soon, condolences), among others. For example, the collaborative content component 140 may encourage, in advance of a user's birthday, contacts of the user on the social network to contribute messages (in the form of video or otherwise) for the user's birthday. The collaborative content component 140 may then aggregate the contributions of the contacts into a playlist or single video, for example, which is then released to the user on the day of his or her birthday.

In some implementations, collaborative content component 140 of server 130 may interact with content sharing platform 120 and/or with other third party social network servers 150 to provide implementations of the disclosure. Further description of the collaborative content component 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
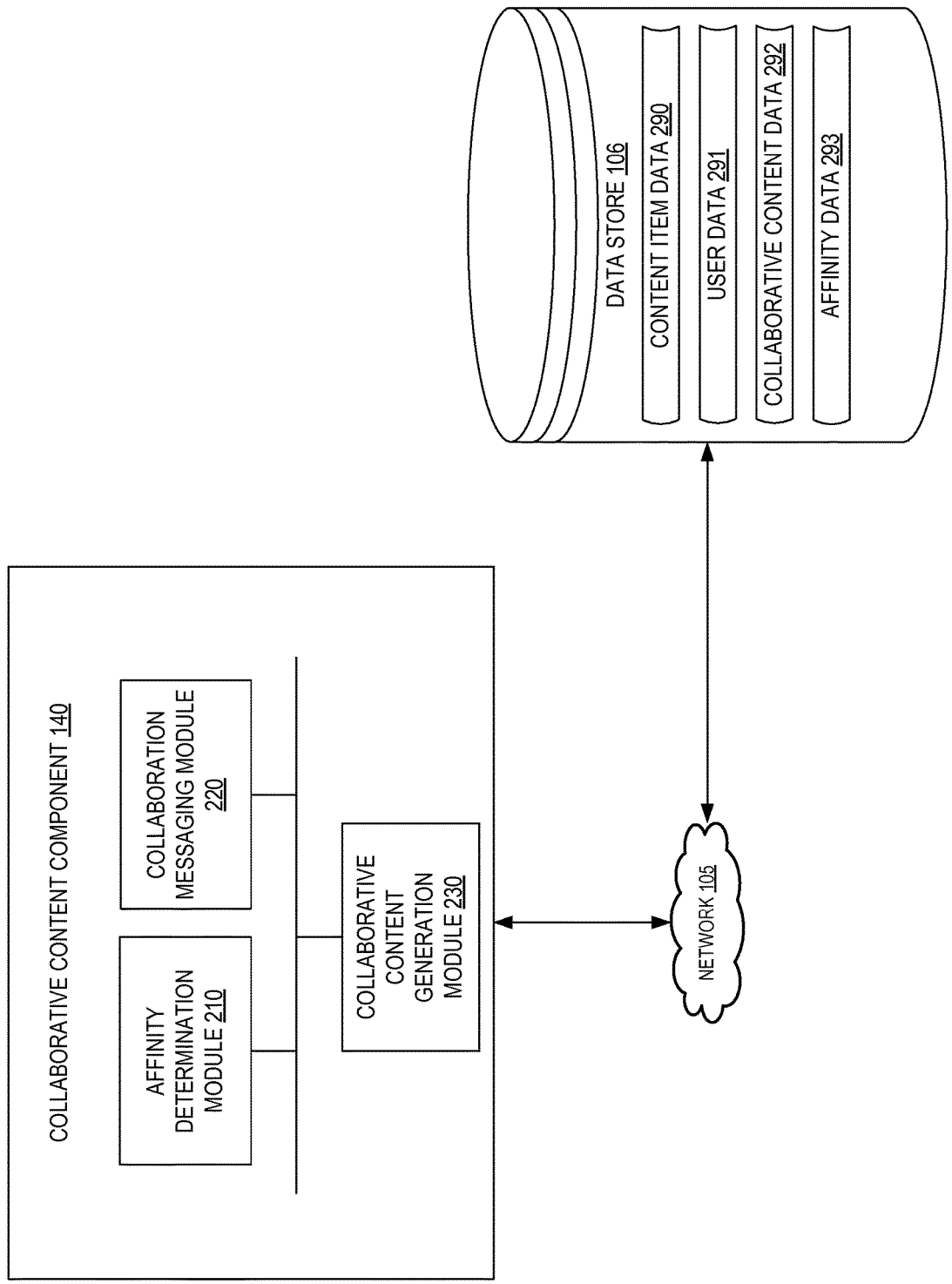
FIG. 2 is a block diagram illustrating a collaborative content component in accordance with one implementation of the disclosure.

FIG. 2 is a block diagram illustrating a collaborative content component 140 in accordance with one implementation of the disclosure. As discussed above, the collaborative content component 140 may interact with a single social network, or may be a utilized among multiple social networks (e.g., provided as a service of a content sharing platform that is utilized by other third party social networks). In one implementation, the collaborative content component 140 includes an affinity determination module 210, a collaboration messaging module 220, and a collaborative content generation module 230. More or less components may be included in the collaborative content component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The collaborative content component 140 is communicatively coupled to the data store 106. For example, the collaborative content component 140 may be coupled to the data store 106 via a network (e.g., via network 105 as illustrated in FIG. 1). In another example, the collaborative content component 140 may be coupled directly to a server where the collaborative content component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, collaborative content data 292, and affinity data 293.

As discussed above, the collaborative content component 140 enables the solicitation of personalized messages for a target user and generation of a collaborative content for the user based on the solicited personalized messages. For example, the collaborative content component 140 may provide support for soliciting and assembling a video to make a more emotionally-compelling greeting or message around certain events corresponding to a user of a social network, such as content sharing platform 120.

The collaborative content component 140 may determine that a special event is approaching for a target user of the social network. For example, the social network may maintain user data 291 in data store 106 that identifies a birthday, or other special event, of the target user. For ease of explanation, the following description may refer to target user's birthday as the special event to solicit and create a collaborative message from contacts of the target user. However, other events of the target user are also (or instead) envisioned as equally applicable to implementations of the disclosure.

In one implementation, once the collaborative content component 140 identifies a special event corresponding to a target user that is a candidate for a collaborative message, the affinity determination module 210 may determine contacts of the target user to reach out to. The affinity determination module 210 may identify all contacts of the target user on a social network and then calculate an affinity score between the target user and each of his or her identified contacts. The affinity scores may be particular to the collaborative message context and may be based on any of a variety of factors including, but not limited to, messaging frequency between the users, co-occurrence of the users in photographs, shared check-ins between the users, shared contacts between the users, shared subscriptions between the users, shared interests between the users, and shared viewing statistics between the users.

The affinity determination module 210 may then identify one or more of the contacts of a target user that have an affinity score with the target user that exceeds a predetermined affinity score threshold. The affinity score calculation factors and/or the affinity score threshold may be configured and adjusted by an administrator of the social network and/or by the target user. The affinity score calculation may be configured to determine which contacts of the user may be considered "close friends" to the target user, and thus are more likely to provide a meaningful message in response to a solicitation for messages for the target user's event. Calculated affinity scores, configuration information for calculating the affinity scores for collaborative content, and/or the affinity score threshold data may be stored as affinity data 293 in data store 106. In some implementations, affinity scores for each selected user may be stored in user data 291 of data store 106.

In some implementations, the affinity determination module 210 may interact with a specific contact of the user, referred to as the "organizing contact", to request the organizing contact to manually select one or more other contacts of the user considered to be "good" candidates for the collaborative message for the target user. In other implementations, a subset of contacts selected by the user (e.g., a circle of friends, etc.) may be used by the affinity determination module 210 to curate a list of contacts to solicit for the collaborative message for the target user.

When a list of contacts of the target user has been selected by the affinity determination module 210, the collaboration messaging module 220 communicates with the selected contacts of the target user to solicit personalized messages for the target user in relation to the event. The collaboration messaging module 220 may use any of a variety of communication mediums to contact the selected contacts. For examples, the selected contacts may be messaged within the social network, over email, text message, mobile notification, in-product promotions, and so on. The solicitation to the selected contacts by the collaboration messaging module 220 informs the selected contacts of the target user's event and requests that the selected contacts provide a message regarding that event. In some implementations, the message may be in the form of video, audio, text, picture, document, mixed media, and so on.

The solicitation from the collaborative messaging module 220 may provide a special location, such as collaborative content data 292 of data store 106, for the selected contacts to send their personalized message for the target user. For example, the special location may include, but is not limited to, an upload location accessed by a link provided in the solicitation message, a playlist created by the collaborative content component 140 to upload the personalized messages, or an email address to send the personalized messages. In other implementations, the personalized message may be titled or otherwise associated with a unique hashtag for the collaborative content. The special location may be associated with a unique identifier (ID) corresponding to the collaborative content for the target user. As such, the content sharing system can distinguish between content uploaded by a selected user for purposes of the collaborative content versus for the selected user's personal account.

The selected contacts of the target user may then provide personalized messages for the target user to the special location. The collaboration messaging module 220 may set a predetermined time period to receive responses, or may provide an open-ended response period based on rate of receipt of responses. In some implementations, the collaboration messaging module 220 may track the selected contacts that have provided personalized messages and send one or more reminders to the selected contacts that have not provided a personalized message. For example, the collaboration messaging module 220 may send reminders and/or a final alert when getting close to the date of the special event, such as the day prior to the special event.

In some implementations, the social network may not be aware of a special event of the target user until the event occurs (e.g., engagement, calamities, etc.). In this case, the collaborative messaging module 220 may immediately begin soliciting messages from the target user's contacts for a predetermined time period subsequent to the occurrence of the event. In other implementations, the time period to receive responses to the solicitation may be a discrete amount of time (e.g., 1 week), or may be flexible and determined based on the amount and frequency of responses received from the contacts. For example, the time period to receive responses may be flexible based on response volume. The collaborative messaging module 220 may continually examine a curve of contacts' response period and perform statistical analysis to determine changes in slope of the curve. If there is large enough decline in rate of interest in uploading in terms of response time, then end time period to receive new videos.

The collaborative content generation module 230 may combine the received personalized messages from the selected contacts into collaborative content product for the target user. The collaborative content generation module 230 may group all of the personalized messages into a single content item, or may gather the personalized messages into a single playlist, to name a few examples. The collaborative content generation module 230 may generate the collaborative content on the day of the target user's special event, when the time period for receipt of personalized messages ends, or immediately upon receipt of the personalized messages, to name a few examples.

Different algorithms may be applied by the collaborative content generation module 230 to determine the order of the personalized messages in the collaborative content (e.g., file or playlist). For example, the selected contacts with the highest affinity scores (calculated by the affinity determination module 210 as described previously) could be put at the start and end of the collaborative content. In another example, personalized messages may be ordered to monotonically increase in terms of affinity score of the selected content through the collaborative content product in order to have the most climactic effect. In another example, the personalized messages are arranged in the collaborative content based on the time the messages were received, so that the first-received messages are placed first and the collaborative content product, and so on. The ordering of personalized messages in the collaborative content can be configurable and may be based on experiments and how responses to the collaborative content vary.

Once the playlist is generated by the system, the collaborative content generation module 230 provides it to the target user on the occurrence of the special event, or upon termination of the personalized message receipt period if the special event was not known to the collaborative content component 140 prior to the event. The collaborative content generation module 230 may set privacy settings of the collaborative content to a default setting. The default setting may allow the target user and the selected contents people who contributed personalized messages to the collaborative content to view the collaborative content. In some implementations, if the collaborative content is a playlist, the contributing selected contacts may only be able to view their personal contribution and not content of other contributing selected contacts. In other implementations, if the collaborative content is a single combined file, then the contributing selected contacts may be warned that other users may be able to view the personalized message being contributed and/or may ask for an acknowledgement/permission before including the selected contact's contribution to the collaborative content.

The collaborative content generation module 230 may generate a message to the target user informing the target user of the collaborative content generated by contacts of the user for the special event, as well as providing a link for the target user to access the collaborative content. In some implementations, the collaborative content may be featured prominently on a home page of the target user on the social network (e.g., replacing site logo of social network, or at the top of every page of social network until the target user accesses it, etc.).

The collaborative content component 140 may also encourage the target user to share the collaborative content. In this case, the privacy setting may be modified by the target user and/or the contributing selected contacts. For example, the target user may request the contributing selected contacts to allow their contributed content to be shared with other users.

Figure 3:
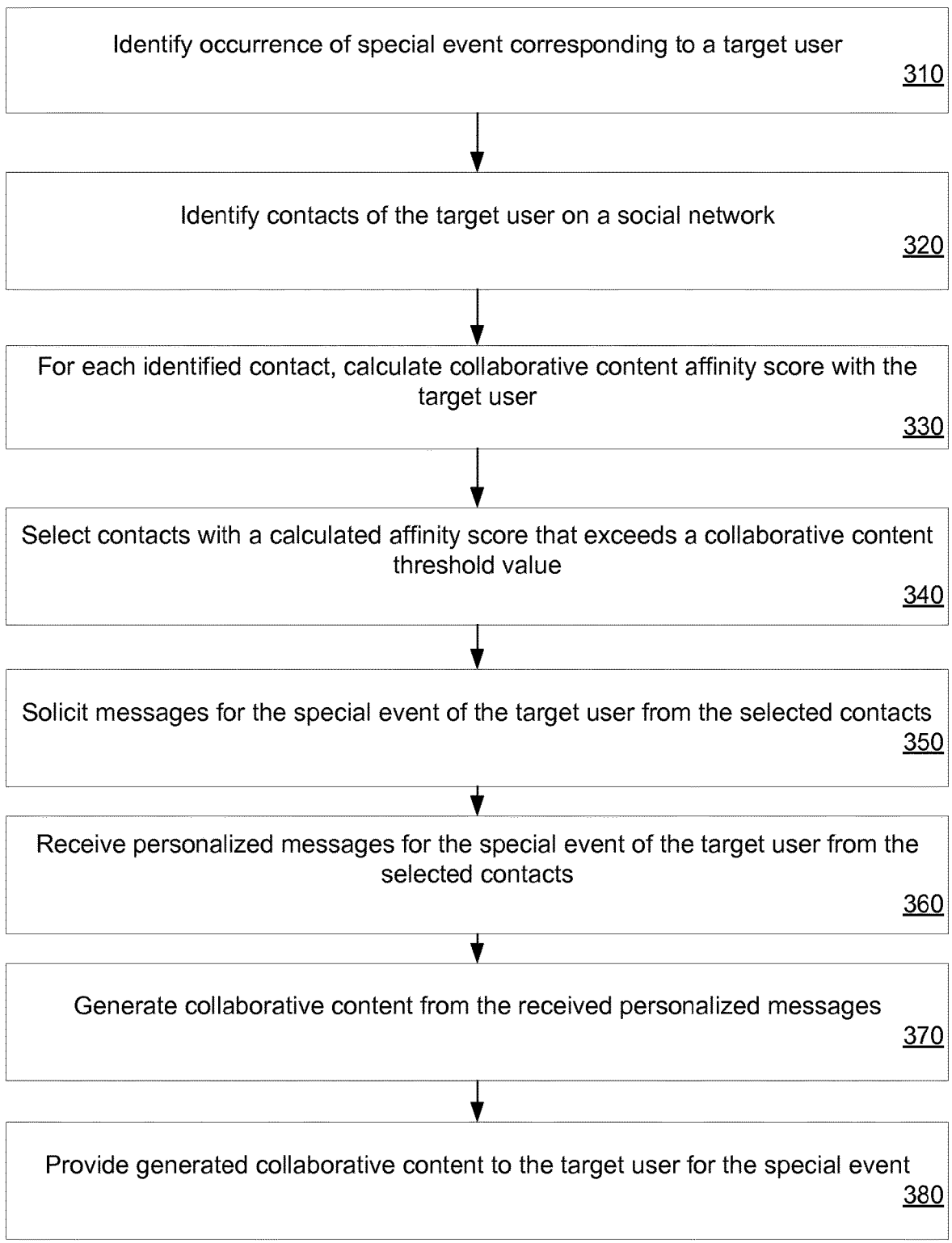
FIG. 3 is a flow diagram illustrating a method for soliciting and creating a collaborative content product, according to some implementations of the disclosure.

FIG. 3 is a flow diagram illustrating a method 300 for soliciting and creating a collaborative content product according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by collaborative content component 140 as shown in FIGS. 1 and 2.

Referring to FIG. 3, method 300 begins at block 310 when an occurrence of a special event corresponding to a target user of a social network is identified. The special event may include a birthday, congratulatory event (new city, new job, promotion, engagement, getting married, new child, etc.), reflections (anniversary of meeting a friend, end of school year, end of job), or calamities (get well soon, condolences), among others. At block 320, contacts of the target user on the social network are identified.

Then, at block 330, for each identified contact, a collaborative content affinity score with the target user is calculated. The collaborative content affinity scores may be based on any of a variety of factors including, but not limited to, messaging frequency between the users, co-occurrence of the users in photographs, shared check-ins between the users, shared contacts between the users, shared subscriptions between the users, shared interests between the users, and shared viewing statistics between the users.

At block 340, contacts with calculated affinity scores that exceed (in some cases, equal or exceed) a collaborative contact affinity score threshold value are selected. The threshold value may be configurable and set by an administrator of the social network and/or the target user. Subsequently, at block 350, messages for the special event of the target user are solicited from the selected contacts. In one implementation, a variety of different communication mediums may be used to contact the selected contacts. For example, the selected contacts may be messaged within the social network, over email, text message, mobile notification, in-product promotions, and so on. The solicitation may inform the selected contacts of the target user's special event and request that the selected contacts provide a message regarding that event.

At block 360, personalized messages for the special event of the target user are received from the selected contacts in response to the solicitations of block 350. In some implementations, the message may be in the form of video, audio, text, picture, document, mixed media, and so on. At block 370, a collaborative content product is generated from the received personalized messages. In one implementation, the personalized messages from the selected contacts are combined into a single content item. In another implementation, the personalized messages are grouped into a single playlist. Different algorithms may be applied to determine the order of the personalized messages in the collaborative content (e.g., file or playlist).

Lastly, at block 380, the generated collaborative content is provided to the target user for the special event. A message may be generated for the target user informing the target user of the collaborative content contributed by contacts of the user for the special event, as well as providing a link for the target user to access the collaborative content. In some implementations, the collaborative content may be featured prominently on a home page of the target user on the social network (e.g., replacing site logo of social network, or at the top of every page of social network until the target user accesses it, etc.).

Figure 4:
FIG. 4 is a flow diagram illustrating a method providing a collaborative content product to a target user, according to some implementations of the disclosure.
Figure 4:

FIG. 4 is a flow diagram illustrating a method 400 for providing a collaborative content product to a target user according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by a client device, such as client device 110A-110Z as shown in FIG. 1.

Referring to FIG. 4, method 400 begins at block 410 when a notification of a collaborative content product is received via a graphical user interface (GUI) of the client device. For example, client device 110A-110Z may be a mobile device providing a GUI (e.g., in an application executing on the mobile device) of a social network providing implementations of the disclosure. In another example, client device 110A-110Z may be a computing device providing a GUI (e.g., of a web page in a web browser) providing implementations of the disclosure. In one implementation, the collaborative content product is generated for a target user of the client device for an event unique to the target user. In a further implementation, the collaborative content product includes content items that are each curated by selected contacts of the target user to convey a personalized message to the target user corresponding to the event unique to the target user.

The selected contacts may each have an affinity score with the target user that exceeds an affinity score threshold value. The affinity score between each of the identified contacts and the target user may be based on at least one of messaging frequency, co-occurrence in photographs, shared check-ins, shared contacts, shared subscriptions, and shared viewing statistics.

Subsequently, at block 420, input from the target user is facilitated via the GUI. The input may request access to the collaborative content product. Lastly, at block 430, the collaborative content product is provided, via the GUI, for display to the target user. In one implementation, the collaborative content produce is a playlist. In another implementation, the collaborative content product is a single video.

Figure 5:
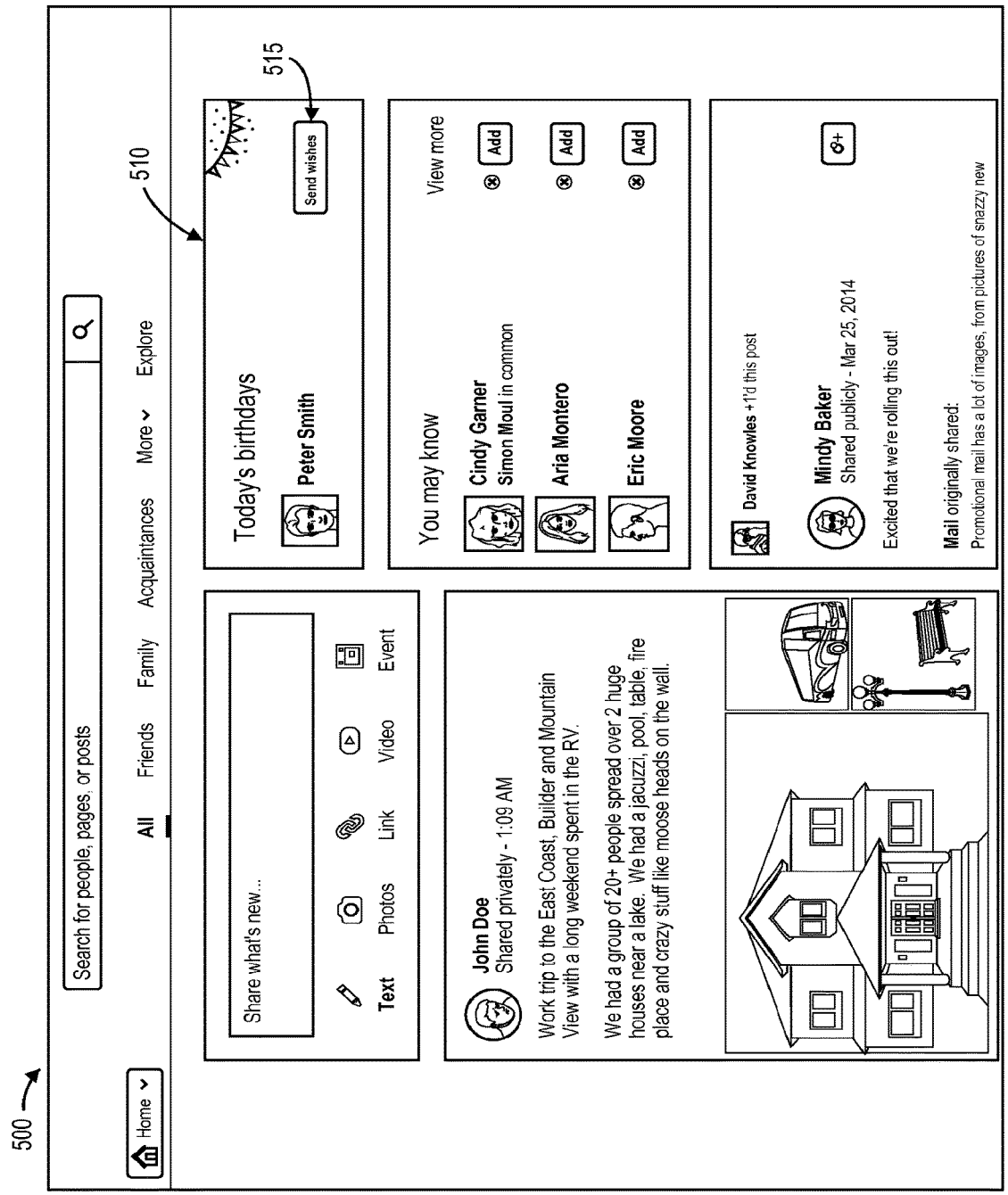
FIG. 5 is a screenshot illustrating an example home page GUI of a contact of a target user on a social network, according to an implementation of the disclosure.

FIG. 5 is a screenshot illustrating an example home page GUI 500 of a contact of a target user on a social network. The home page GUI may include a solicitation 510 for the contact to send a personalized message to a target user. For example, the solicitation 510 may be a section of the home page providing a notification of the special event (e.g., a birthday) of the target user. The solicitation 510 may include a link 515 that, when selected by the contact, allows the contact to send the personalized message as discussed above.

Figure 6:
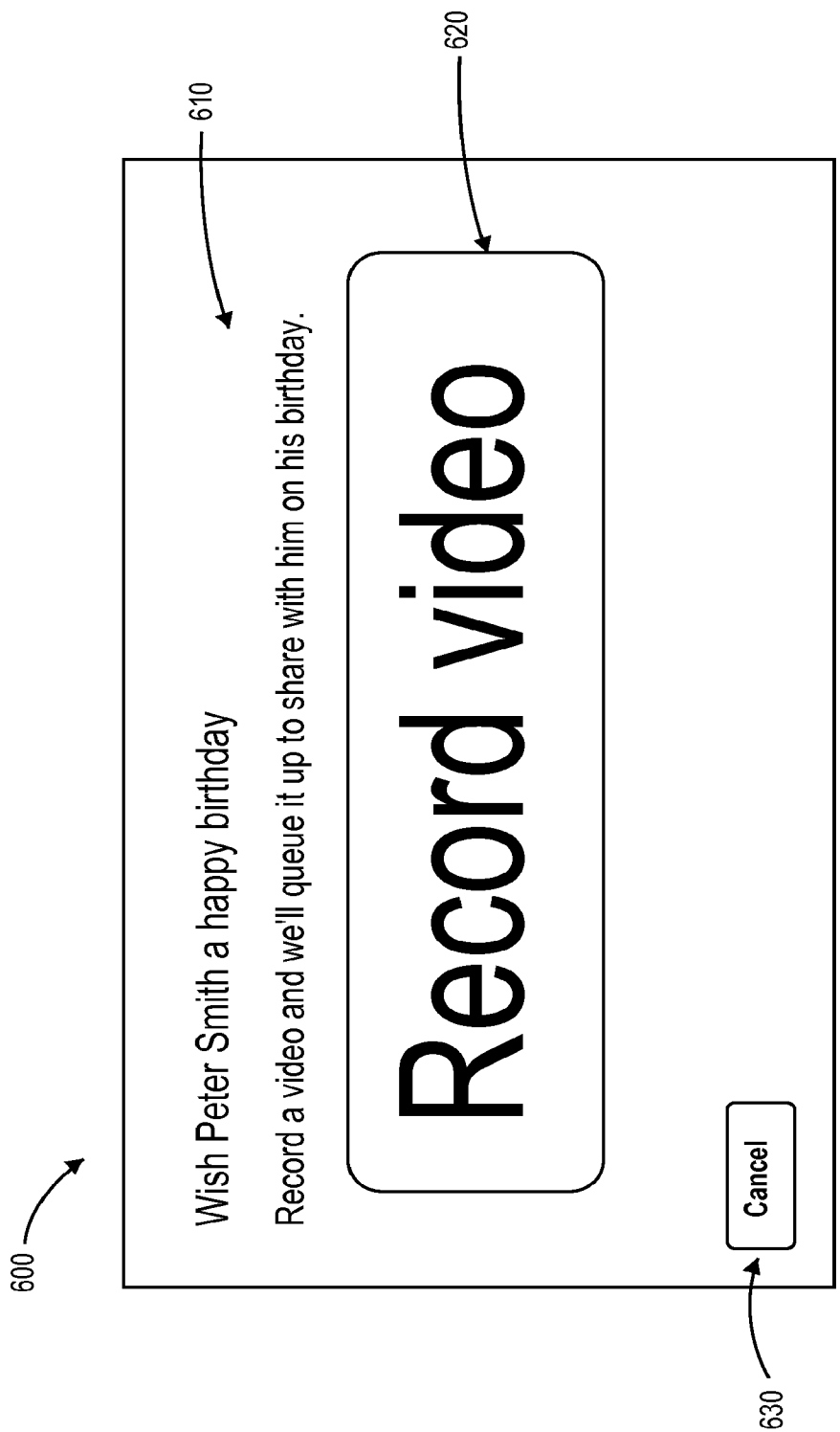
FIG. 6 is a screenshot illustrating a solicitation to a contact of a target user on a social network, according to an implementation of the disclosure.

FIG. 6 is a screenshot illustrating a solicitation 600 to a contact of a target user on a social network. Solicitation 600 may be a pop-up GUI on another GUI, such as a page or application, of a social network of the contact. The solicitation 600 also includes a link 620 that, when selected by the contact, allows the contact to send the personalized message as discussed above. In addition, the solicitation 600 includes a 'cancel' link 630 allowing the contact to escape from or close the solicitation 600.

Figure 7:
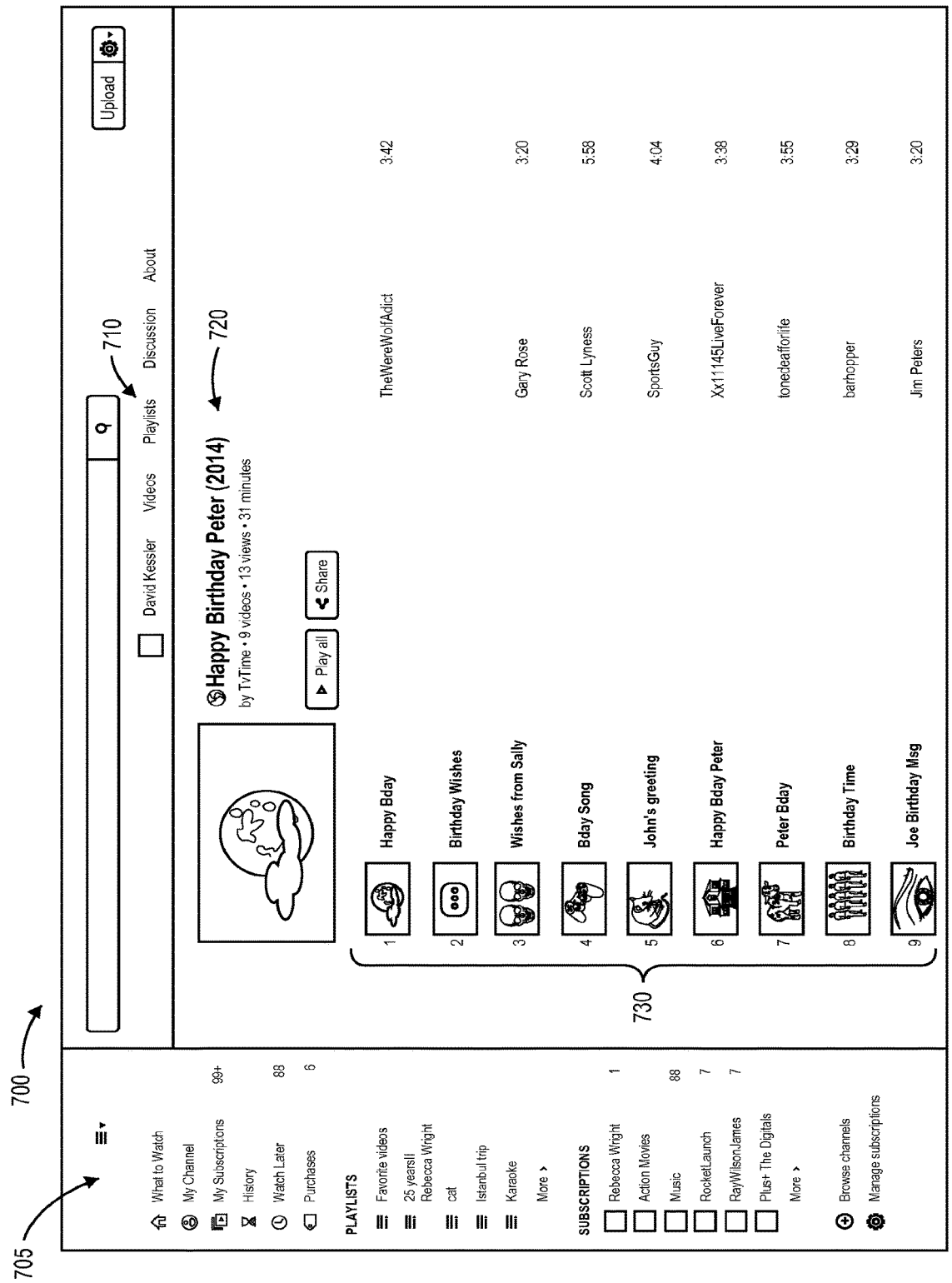
FIG. 7 is a screenshot illustrating a home page GUI of a target user that displays a collaborative content product generated for the target user, to an implementation of the disclosure.

FIG. 7 is a screenshot illustrating a home page GUI 700 of a target user that displays a collaborative content product generated for the target user from personalized contact contributed by contacts of the target user. Home page GUI 700 may include a menu column 705 with content and locations of the social network that are personalized for the target user. Home page GUI 700 also includes a playlist tab 710. The playlist tab displays a collaborative content product 720 (e.g., a playlist) generated for the target user. The collaborative content product 720 include content items 730 contributed by contacts of the user in response to a solicitation to the contacts from the social network. The content items 730 may include personalized messages generated by the contacts of the target user.

Figure 8:
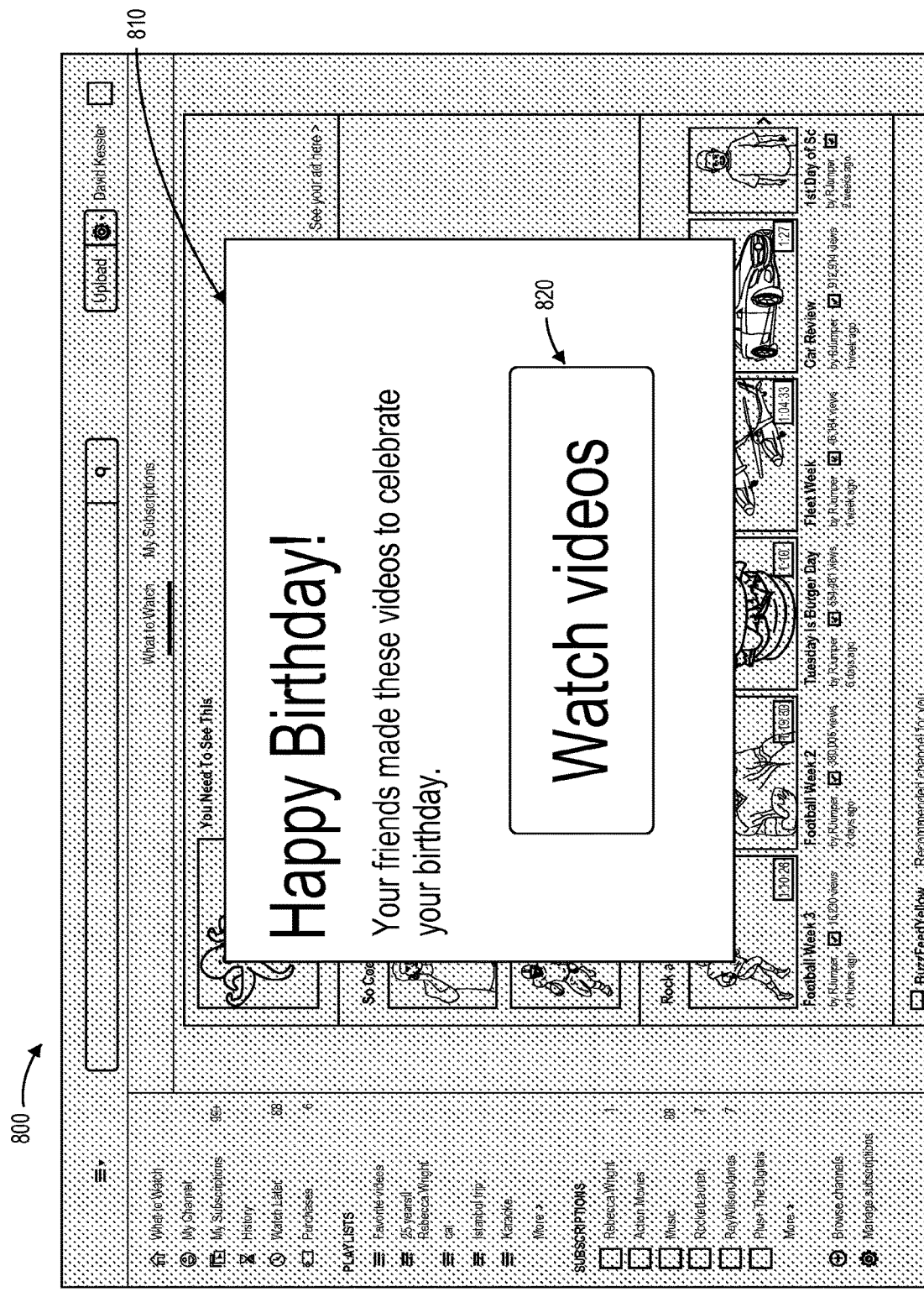
FIG. 8 is a screenshot illustrating another home page GUI of a target user displaying a pop-up window notifying the target user of a collaborative content product generated for the target user, according to an implementation of the disclosure.

FIG. 8 is a screenshot illustrating another home page GUI 800 of a target user displaying a pop-up GUI 810 notifying the target user of a collaborative content product generated for the target user. The notification in the pop-up GUI 810 informs the target user that the collaborative content item has been generated for the target user for a special event of the target user and includes personalized messages contributed by contacts of the target user. The notification in the pop-up GUI 810 also may include a link 820 that allows the target user to access the collaborative content product to view.

Figure 9:
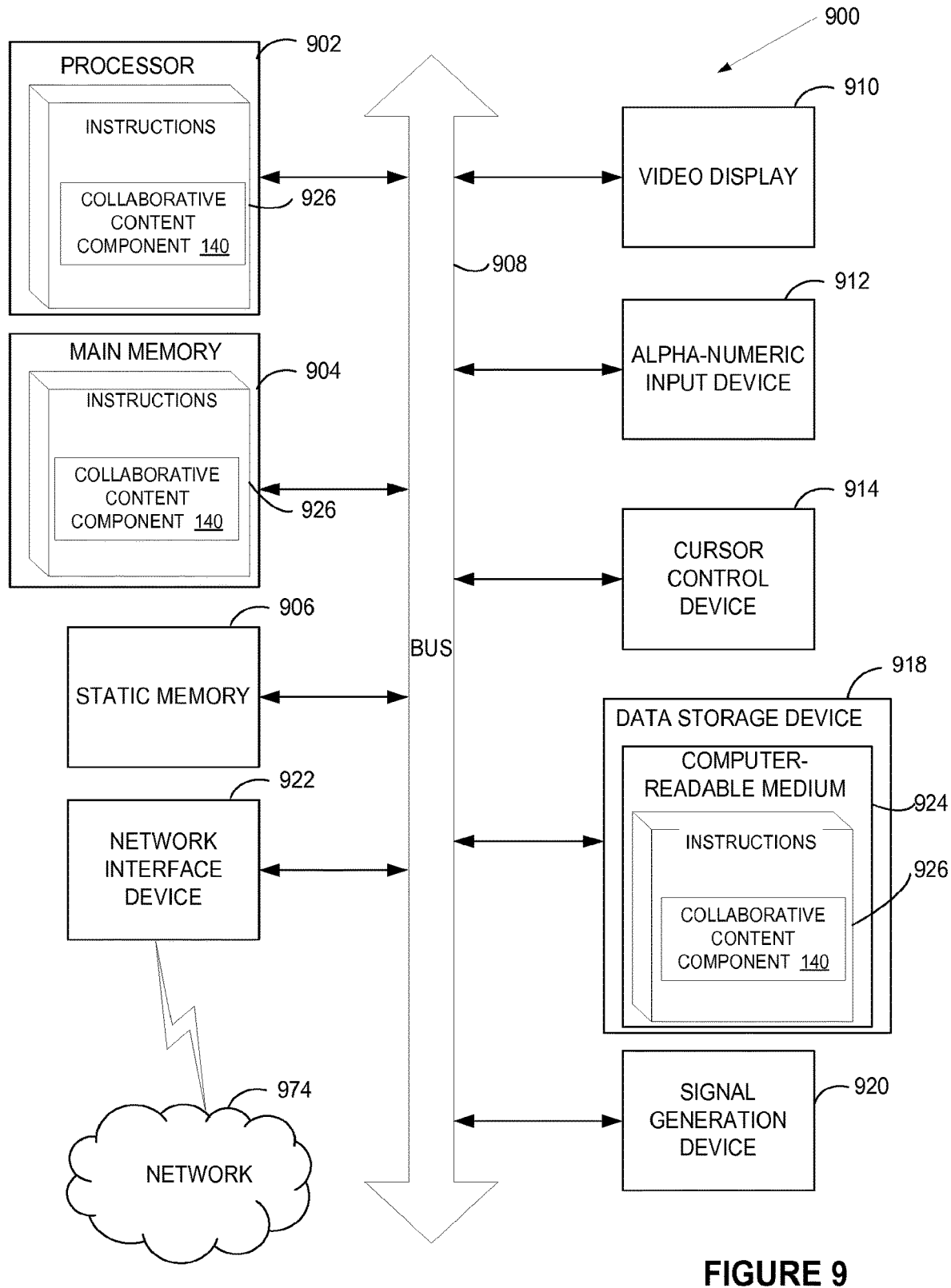
FIG. 9 is a block diagram illustrating an exemplary computer system, according to some implementations.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD), a cathode ray tube (CRT), or a touch screen), an alphanumeric input device 912 (e.g., a keyboard), a cursor control device 914 (e.g., a mouse), and a signal generation device 920 (e.g., a speaker).

The data storage device 918 may include a computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 902 during execution thereof by the computer system 900, the main memory 904 and the processor 902 also constituting computer-readable storage media. The instructions 926 may further be transmitted or received over a network 974 via the network interface device 922.

In one implementation, the instructions 926 include instructions for a collaborative content component 140, which may correspond, respectively, to its identically-named counterpart described with respect to FIGS. 1 and 2, and/or a software library containing methods for soliciting and creating collaborative content items. While the computer-readable storage medium 924 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device of a user device of a first user, a request to contribute a content item for a personalized message to a second user, the personalized message for an event unique to the second user, wherein the first user is selected to receive the request to contribute the content item based on an affinity score between the first user and the second user on a social network;
   presenting, by the processing device via a graphical user interface (GUI) of the user device, the request to contribute the content item;
   receiving, by the processing device via the GUI, input from the first user identifying the content item to contribute for the personalized message to the second user;
   identifying a collaborative content product generated for the second user for the event, the collaborative content product comprising a plurality of other content items of other users of the social network and ordered in the collaborative content product in accordance with corresponding affinity scores between the second user and the other users;
   determining a position in the order for the content item amongst the other content items in the collaborative content product, the position in the order determined in accordance with corresponding affinity scores between the second user and the first user; and
   causing the content item to be added to the collaborative content product in accordance with the order.

2. The method of claim 1, wherein the corresponding affinity scores between the second user and the other users are based on at least one of messaging frequency, co-occurrence in photographs, co-occurrence in videos, shared check-ins, shared contacts, shared subscriptions, or shared viewing statistics.

3. The method of claim 1, further comprising maintaining a container to maintain content items for the collaborative content product prior to the generating the collaborative content product.

4. The method of claim 1, wherein the collaborative content product comprises a playlist.

5. The method of claim 1, wherein the collaborative content product comprises a single video.

6. The method of claim 5, further comprising stitching content items for the collaborative content product together to generate the single video.

7. The method of claim 5, wherein the content items are ordered in decreasing value of the affinity score of a corresponding contributing user of the users with the second user.

8. The method of claim 1, further comprising providing a one-time email address for the first user to send the content item for the second user.

9. The method of claim 1, further comprising setting a privacy setting of the collaborative message to a default of the second user and the other users.

10. The method of claim 1, further comprising receiving, from a designated contact of the other users providing the content items, a selection of a set of the other users to solicit the contents items conveying the personalized messages for the second user.

11. The method of claim 10, wherein the designated contact is provided permission to add new users to the collaborative content product.

12. An apparatus comprising:
   a memory; and
   a processing device communicably coupled to the memory, the processing device to execute instructions to:
   receive a request for a first user to contribute a content item for a personalized message to a second user, the personalized message for an event unique to the second user, wherein the first user is selected to receive the request to contribute the content item based on an affinity score between the first user and the second user on a social network;
   present, via a graphical user interface (GUI) of the user device, the request to contribute the content item;
   receive, via the GUI, input from the first user identifying the content item to contribute for the personalized message to the second user; and
   identify a collaborative content product generated for the second user for the event, the collaborative content product comprising a plurality of other content items of other users of the social network and ordered in the collaborative content product in accordance with corresponding affinity scores between the second user and the other users;

determine a position in the order for the content item amongst the other content items in the collaborative content product, the position in the order determined in accordance with corresponding affinity scores between the second user and the first user; and cause the content item to be added to the collaborative content product in accordance with the order.

13. The apparatus of claim 12, wherein the corresponding affinity scores between the second user and the other users are based on at least one of messaging frequency, co-occurrence in photographs, co-occurrence in videos, shared check-ins, shared contacts, shared subscriptions, or shared viewing statistics.

14. The apparatus of claim 12, wherein the collaborative content product comprises a playlist.

15. The apparatus of claim 12, wherein the collaborative content product comprises a single video.

16. The apparatus of claim 15, wherein the processing device further to stitch content items for the collaborative content product together to generate the single video.

17. The apparatus of claim 15, wherein the content items are ordered in decreasing value of the affinity score of a corresponding contributing user of the other users with the second user.

18. A non-transitory machine-readable storage medium storing instructions which, when executed, cause a processing device to perform operations comprising:

receiving, by the processing device of a user device of a first user, a request to contribute a content item for a personalized message to a second user, the personalized message for an event unique to the second user, wherein the first user is selected to receive the request to contribute the content item based on an affinity score between the first user and the second user on a social network;

presenting, by the processing device via a graphical user interface (GUI) of the user device, the request to contribute the content item;

receiving, by the processing device via the GUI, input from the first user identifying the content item to contribute for the personalized message to the second user; and identifying a collaborative content product generated for the second user for the event, the collaborative content product comprising a plurality of other content items of other users of the social network and ordered in the collaborative content product in accordance with corresponding affinity scores between the second user and the other users;

determining a position in the order for the content item amongst the other content items in the collaborative content product, the position in the order determined in accordance with corresponding affinity scores between the second user and the first user; and causing the content item to be added to the collaborative content product in accordance with the order.

19. The non-transitory machine-readable storage medium of claim 18, wherein the corresponding affinity scores between the second user and the other users are based on at least one of messaging frequency, co-occurrence in photographs, co-occurrence in videos, shared check-ins, shared contacts, shared subscriptions, or shared viewing statistics.

20. The non-transitory machine-readable storage medium of claim 18, wherein the collaborative content product comprises a playlist.

21. The non-transitory machine-readable storage medium of claim 18, wherein the collaborative content product comprises a single video.

22. The non-transitory machine-readable storage medium of claim 18, further comprising setting a privacy setting of the collaborative message to a default of the second user and the other users.

* * * * *